US009348712B1

(12) United States Patent
Dongre et al.

(10) Patent No.: US 9,348,712 B1
(45) Date of Patent: May 24, 2016

(54) POLICY-BASED VOLUME CACHING IN A CLUSTERED STORAGE SYSTEM

(75) Inventors: Rommel D. Dongre, Sunnyvale, CA (US); Michael R. Eisler, Colorado Springs, CO (US); Andrew Narver, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 189 days.

(21) Appl. No.: 12/976,803

(22) Filed: Dec. 22, 2010

(51) Int. Cl.
G06F 15/173 (2006.01)
G06F 11/20 (2006.01)
G06F 17/30 (2006.01)
G06F 3/06 (2006.01)
H04L 12/54 (2013.01)
H04L 12/26 (2006.01)

(52) U.S. Cl.
CPC .......... G06F 11/2087 (2013.01); G06F 3/0631 (2013.01); G06F 17/30902 (2013.01); H04L 12/5695 (2013.01); H04L 43/0817 (2013.01)

(58) Field of Classification Search
CPC .......... G06F 11/2087; G06F 17/30902; G06F 3/0631; H04L 12/5695; H04L 43/0817
USPC ......... 709/244, 121, 216, 219, 226, 245, 223; 370/389, 467; 711/3, 114, 113, 118, 711/137
See application file for complete search history.

(56) References Cited

U.S. PATENT DOCUMENTS

| | | | |
|---|---|---|---|
| 6,345,338 B1 * | 2/2002 | Milillo et al. | 711/137 |
| 7,596,564 B1 * | 9/2009 | O'Connell et al. | |
| 7,895,244 B1 * | 2/2011 | Sobel et al. | 707/809 |
| 8,032,713 B2 * | 10/2011 | Allen et al. | 711/137 |
| 8,291,034 B1 * | 10/2012 | Gopalan et al. | 709/212 |
| 2002/0038301 A1 * | 3/2002 | Aridor et al. | 707/10 |
| 2002/0059440 A1 * | 5/2002 | Hudson et al. | 709/231 |
| 2002/0091788 A1 * | 7/2002 | Chlan et al. | 709/213 |
| 2003/0225924 A1 * | 12/2003 | Jung et al. | 709/313 |
| 2005/0129016 A1 * | 6/2005 | Taninaka et al. | 370/389 |
| 2006/0206662 A1 * | 9/2006 | Ludwig et al. | 711/114 |
| 2007/0038644 A1 * | 2/2007 | Kaneda et al. | 707/10 |
| 2007/0180119 A1 * | 8/2007 | Khivesara et al. | 709/226 |
| 2007/0189153 A1 * | 8/2007 | Mason | 370/216 |
| 2007/0244908 A1 * | 10/2007 | Rajan | 707/10 |
| 2007/0288586 A1 * | 12/2007 | Wu et al. | 709/212 |
| 2008/0147972 A1 * | 6/2008 | Allison et al. | 711/113 |
| 2008/0235400 A1 * | 9/2008 | Slocombe et al. | 709/245 |
| 2009/0100496 A1 * | 4/2009 | Bechtolsheim et al. | 725/147 |
| 2009/0132639 A1 * | 5/2009 | Yan | 709/202 |
| 2009/0150534 A1 * | 6/2009 | Miller et al. | 709/223 |
| 2009/0164635 A1 * | 6/2009 | Denker et al. | 709/226 |
| 2009/0172274 A1 * | 7/2009 | Nochimowski et al. | 711/114 |

(Continued)

*Primary Examiner* — Thuong Nguyen
(74) *Attorney, Agent, or Firm* — Nixon Peabody LLP

(57) ABSTRACT

Described herein is a novel technique for implementing a policy-based caching engine in a storage system cluster (cluster) to automatically implement volume caching at select nodes of the cluster in optimizing cluster performance. The novel caching engine may be implemented in a management console of the cluster storing policy information related to volume caching operations requested by the caching engine. Policy information may include node or cluster attributes, operational events, and a pre-defined cached volume configuration of import to the user. Based on the stored policy information, the caching engine may determine a set of nodes on which to initiate a volume caching operation and generate a request for such operation to be performed on a particular node. Only select nodes in the cluster may thus implement volume caching to thereby conserve processing resources for more critical operations at other select nodes in the cluster.

21 Claims, 8 Drawing Sheets

(56) References Cited

U.S. PATENT DOCUMENTS

| | | | |
|---|---|---|---|
| 2009/0282125 A1* | 11/2009 | Jeide et al. | 709/217 |
| 2010/0010991 A1* | 1/2010 | Joshi | 707/5 |
| 2010/0146045 A1* | 6/2010 | Moore et al. | 709/203 |
| 2010/0174867 A1* | 7/2010 | Gill et al. | 711/118 |
| 2010/0312861 A1* | 12/2010 | Kolhi et al. | 709/219 |
| 2011/0047437 A1* | 2/2011 | Flynn | 714/758 |
| 2012/0011394 A1* | 1/2012 | Maki et al. | 714/6.3 |
| 2012/0036161 A1* | 2/2012 | Lacapra et al. | 707/781 |
| 2012/0047561 A1* | 2/2012 | Bloesch | 726/4 |
| 2012/0210041 A1* | 8/2012 | Flynn et al. | 711/3 |
| 2012/0303575 A1* | 11/2012 | Crolene et al. | 707/609 |
| 2012/0303737 A1* | 11/2012 | Kazar et al. | 709/213 |
| 2013/0044765 A1* | 2/2013 | Chen et al. | 370/401 |
| 2013/0304844 A1* | 11/2013 | Lango et al. | 709/216 |
| 2015/0149579 A1* | 5/2015 | Hind et al. | 709/213 |

* cited by examiner

POLICY-BASED VOLUME CACHING IN A CLUSTERED STORAGE SYSTEM

FIELD OF THE INVENTION

The present invention relates to data storage systems, and particularly, to a technique for implementing a policy-based data caching engine in a clustered storage system (cluster) for automatically generating cached storage objects on select nodes of the cluster.

BACKGROUND OF THE INVENTION

A data storage system typically includes one or more storage devices into which information may be entered, and from which information may be obtained. The storage system may include a storage operating system that functionally organizes the storage system by invoking storage operations in support of a storage service implemented by the storage system. The storage system may be implemented with a variety of storage architectures including, but not limited to, a network-attached storage (NAS) environment, a storage area network (SAN), a direct-attached storage environment, and any combination thereof. The storage devices are typically disk drives organized as a storage array, although other storage devices (e.g., flash memory) may also constitute the array.

The storage operating system may implement a high-level abstraction layer to logically organize information as a hierarchical structure of storage objects, such as file systems, volumes, directories, and files. For example, each "on-disk" file may be implemented as set of data structures, e.g., blocks, configured to store information, such as the actual data for the file. These blocks may be organized within a volume implementing a volume block number (vbn) space that is maintained by the file system, whereby each volume may be, although is not necessarily, associated with its own file system. In certain cases, one or more volumes may additionally be organized to form a higher-level storage object, such as an aggregate, of the storage system.

The storage system may further be configured to operate according to a client/server model of information delivery to allow many clients access to information stored on the storage system. In this model, a client may constitute an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (a read or write request) as an object-based (e.g., file- or block-based) protocol message to the storage system over the network.

Multiple storage systems may be interconnected to provide a clustered storage system (cluster) configured to service access requests using the combined resources of the cluster, where each storage system may be a "node" of the cluster. In some cases, the cluster may implement aggregates that may be distributed across the nodes of the cluster. Such aggregates may thus be configured to include one or more volumes, which may be served by the cluster in response to client requests for information organized within an aggregate.

Each node may constitute functional components that cooperate to provide a distributed architecture for the cluster. Such components may include a network element (N-blade or N-module), a storage element (D-blade or D-module), and a management element (M-host). The N-module may enable the node to connect to clients over the network, while the D-module may enable the node to connect to storage devices for storing data to and retrieving data from storage objects. In contrast, the M-host may generate information sharing operations to present a distributed file system image for the cluster.

Generally, the cluster may provide access to the totality of storage provided by the nodes ("cluster storage") when clients connect to a node and submit an access request targeted at a storage object on the cluster storage. An N-module may be configured to receive the request and forward the request to a target D-module in the cluster which manages the requested storage object. The D-module may be targeted, for example, via the M-host functionality which manages a mapping between storage objects and D-modules in the cluster managing such respective storage objects. In the case of a read request, the target D-module may forward retrieved data to the N-module, which may in turn forward the retrieved data to the client in response to the read request.

One technique for improved servicing of requests by a node involves accelerating access to remote data (e.g., a volume) by caching the volume at the node receiving the request. A cached volume may accelerate access by avoiding the need for the node to retrieve such data from a remote node. In one example, the node may periodically request a pre-defined amount of data from the remote node prior to a client request for such data. In other examples, known techniques may be implemented to determine the amount and type of data to cache based on an access request history for the volume. By implementing volume caching techniques in a cluster, processing overhead at the nodes may be reduced while also conserving cluster bandwidth.

Challenges may arise, however, when seeking to optimize overall cluster performance using known volume caching techniques. For instance, known techniques may implement cached volumes at all nodes in the cluster to provide acceleration at all client access points of the cluster. However, these techniques fail to account for node-specific features (e.g., workload limits, storage space limits) to allow for the conservation of processing resources at select nodes.

To account for node-specific features, a user (administrator) of the cluster must possess detailed knowledge of the cluster layout (topology), including the specific features for each node. Based on this knowledge, the user may determine the nodes on which to implement volume caching and manually implement cached volumes on such determined nodes. As storage demands grow and the number of nodes in the cluster increases to meet those demands, there is a need for an improved method for caching volumes to optimize cluster performance.

SUMMARY OF THE INVENTION

Described herein is a novel technique for implementing a policy-based caching engine in a storage system cluster (cluster) to automatically implement volume caching at select nodes of the cluster. The novel caching engine may be implemented in a management console of the cluster storing policy information related to volume caching operations requested by the caching engine. Policy information may include node or cluster attributes, operational events, and a pre-defined cached volume configuration of import to the user. Based on the stored policy information, the caching engine may determine a set of nodes on which to initiate a volume caching operation and generate a request for such operation to be performed on a particular node. Only select nodes in the cluster may thus implement volume caching to thereby conserve processing resources for more critical operations at other select nodes in the cluster.

To optimize cluster performance, volume caching operations requested by the caching engine may involve generating or deleting a cached volume at a node. A cached volume may be generated at the node when attributes of the node are in conformance with node attributes in the stored policy information as an example. In another example, a cached volume may be generated or deleted upon the occurrence of an operational event at or related to the node in accordance with the stored policy information. When generating a cached volume, the pre-defined configuration stored in the policy information may further be included in the request for implementation at the node. The caching engine may thus automatically determine a conformance between a node and the policy information to initiate a particular volume caching operation.

The novel technique advantageously overcome deficiencies with the prior art since a volume caching operation may automatically be performed at select nodes in the cluster based on policy information stored at a management console. The user need not possess detailed knowledge of the cluster topology, nor node-specific features, to selectively implement volume caching on the nodes. Instead, a user may simply supply policy information to the caching engine for implementation across the cluster. As nodes in the cluster change over time to meet changing storage needs, the novel technique of policy-based volume caching may provide a more adaptive solution for optimizing cluster performance in an automated manner.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

I. Cluster Environment

Figure 1A:
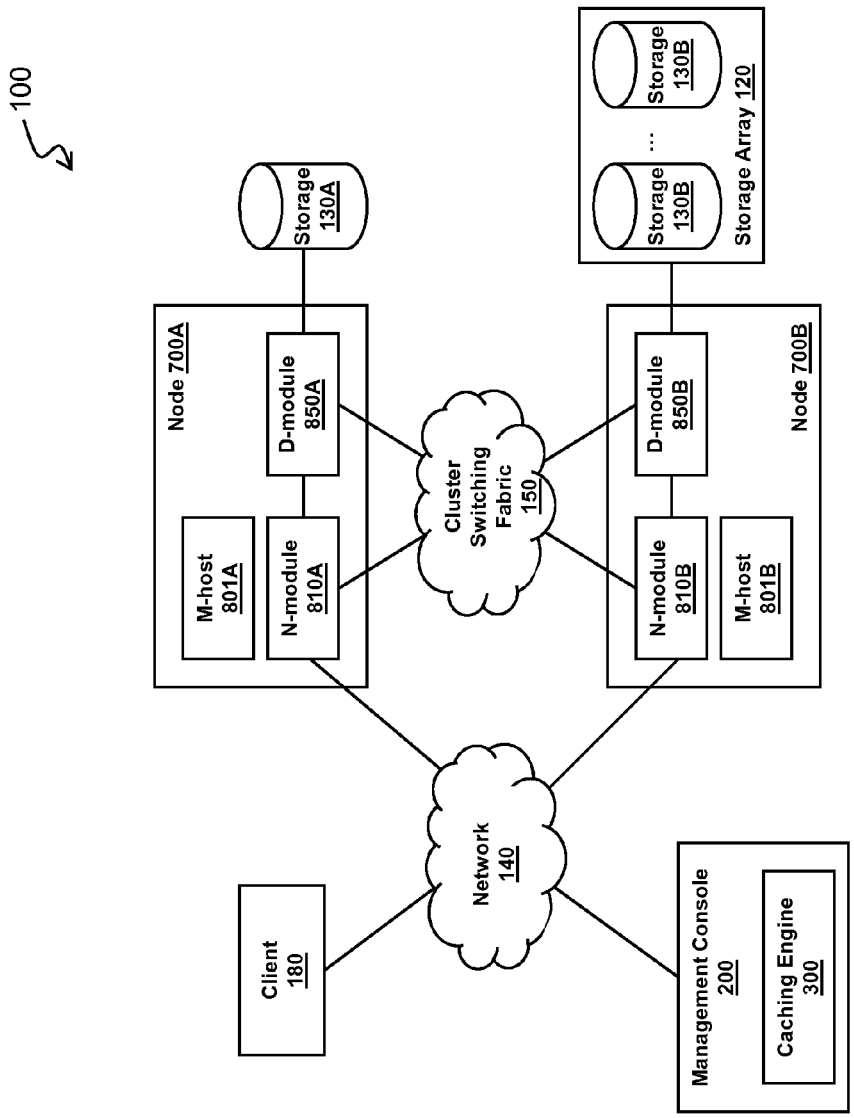
FIGS. 1A-B are schematic block diagrams of an exemplary storage system cluster environment (cluster) implementing volume caching according to one embodiment.
Figure 1B:
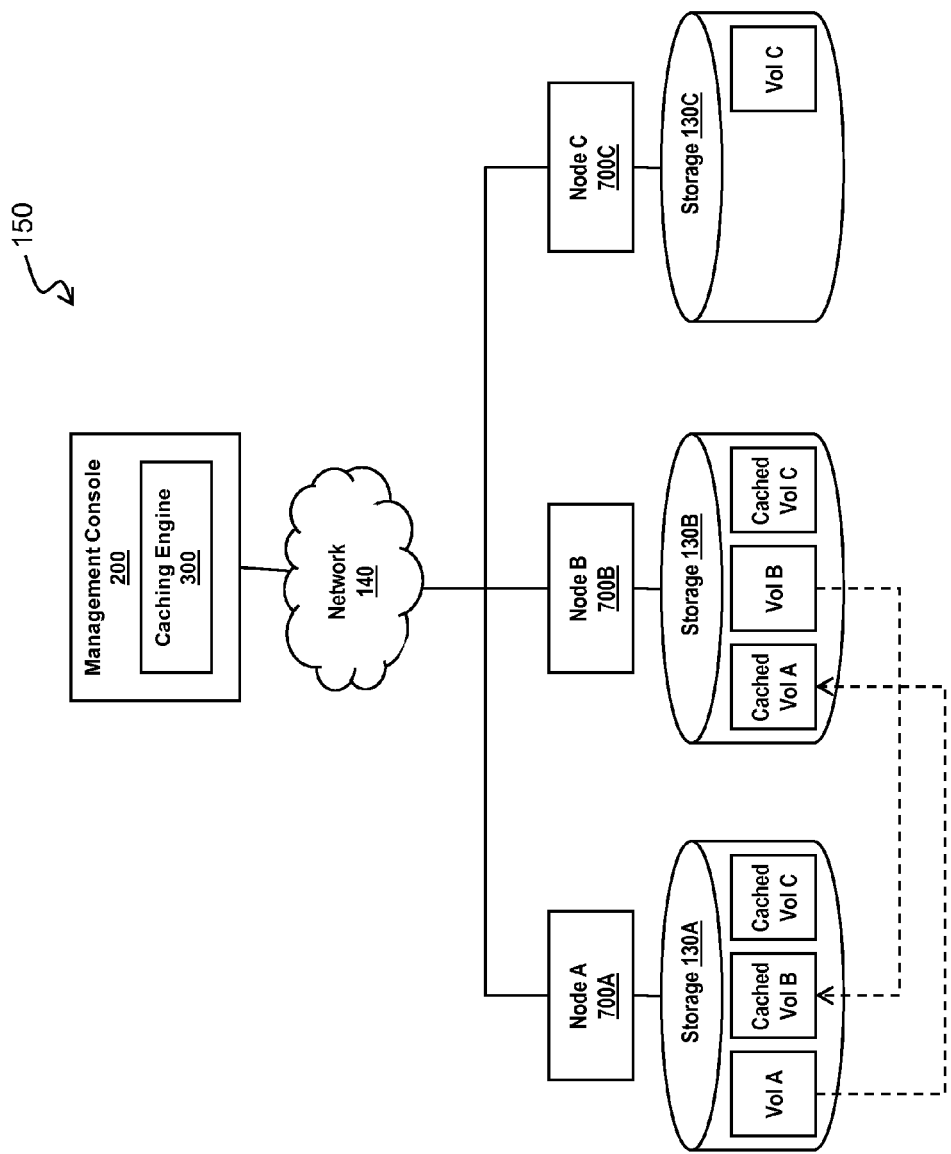

FIGS. 1A-B are schematic block diagrams of an exemplary cluster environment 100 in which some embodiments operate. Cluster 100 may comprise two or more interconnected nodes 700 (node 700A, 700B) configured to provide access to data stored on a set of storage devices constituting storage 130 of cluster 100. Storage services may be provided by nodes 700 implementing various functional components that cooperate to provide a distributed storage system architecture of cluster 100.

Illustratively, each node 700 may be organized as one or more network (N-module 810) or storage elements (D-module 850), and a management element (M-host 801). N-module 810 may include functionality to enable node 700 to connect to one or more clients 180 over a computer network 140, while each D-module 850 may connect to storage 130 implementing a storage array 120. M-host 801 may provide cluster communication services between nodes 700 for generating information sharing operations and for presenting a distributed file system image for cluster 100. Nodes 700 may further be interconnected by a cluster switching fabric 150 described further below.

It should also be noted that while there is shown an equal number of N and D-modules constituting nodes 700, there may be a different number and/or type of functional components embodying node 700 in accordance with various embodiments of the present invention. For example, there may be multiple N-modules and/or D-modules interconnected in cluster 100 that do not reflect a one-to-one correspondence between the modules of nodes 700. Accordingly, the description of node 700 comprising one N- and one D-module should be taken as illustrative only and it will be understood that the novel technique is not limited to the illustrative embodiment discussed herein.

Client 180 may be a general-purpose computer configured to interact with node 700 in accordance with a client/server model of information delivery. To that end, client 180 may request the services of node 700 by submitting a read or write request to node 700. In response to the request, node 700 may return the results of the requested services by exchanging information packets over network 140 with client 180. Client 180 may submit access requests by issuing packets using object-based access protocols, such as the Common Internet File System (CIFS) protocol, Network File System (NFS) protocol, Small Computer Systems Interface (SCSI) protocol encapsulated over TCP (iSCSI), and SCSI encapsulated over Fibre Channel (FCP) for instance. Preferably, node 700 may implement a combination of file-based and block-based protocols to communicate with client 180.

Cluster 100 may further include a management console 200 for providing management services for the overall cluster. Management console 200 may, for instance, communicate with node 700 across network 140 to request operations to be performed at node 700, and to request information (e.g., node configurations, operating metrics) from or provide information to node 700. In addition, management console 200 may be configured to receive inputs from and provide outputs to a user of cluster 100 (e.g., storage administrator) thereby operating as a centralized management interface between the administrator and cluster 100. In the illustrative embodiment, management console 200 may be networked to nodes 700 and client 180 although other embodiments of the present invention may implement management console 200 as a functional component of node 700, client 180, or any other processing system connected to or constituting cluster 100.

In a distributed architecture, client 180 may submit an access request to a node for data stored at a remote node. As an example, an access request from client 180 may be sent to node 700A which may target a storage object (e.g., volume) on node 700B in storage 130B. To accelerate servicing of the access request and optimize cluster performance, node 700A may cache the requested volume in local memory or in storage 130A. For instance, during initialization of node 700A, node 700A may request all or a portion of the volume from node 700B for storage at node 700A prior to an actual request by client 180 for such data.

It will be appreciated that known techniques for requesting remote data in advance of a client request may be implemented when performing volume caching. Such techniques are well-known in the art and not germane to the present invention; however, a brief description is provided herein for completeness. For instance, cached volumes may be implemented based on a frequency of requests for a subject volume. In one example, management console 200 may request access (e.g., frequency) information from a subject node to determine the subject volume to be the most frequently accessed on the subject node. A request may then be forwarded by management console 200 to the other nodes in the cluster to cache the subject volume. Nodes may respond to a caching request by requesting the subject volume from the subject node to generate the cached volume. Updates to a cached volume may then be carried by the nodes periodically exchanging a series of messages with the subject node to synchronize data in the cached volume and data in the subject volume.

In conventional implementations, data may be cached at all nodes 700 in cluster 100 to accelerate servicing of access requests at any of nodes 700. However, such techniques may fail to adapt to node-specific features which may instead require a conservation of processing resources for more critical storage operations in lieu of caching operations. To avoid processing overhead associated with volume caching at select nodes, the administrator must possess detailed knowledge of the cluster topology to determine on which nodes to implement caching. As the number of nodes in the cluster grows and the complexity of the cluster increases, the conventional techniques are an unwieldy and impractical approach to managing the cluster.

To overcome such limitations, a novel caching engine 300 may be implemented in cluster 100 to implement cached volumes on select nodes 700 in the cluster. Illustratively, caching engine 300 may be implemented in management console 200 although it will be appreciated that caching engine 300 may be implemented in other processing systems connected with or constituting cluster 100 in accordance with teachings of the present invention. For instance, aspects of caching engine 300 may be implemented in M-host 801 for carrying out the distributed operations of caching engine 300 across cluster 100 to result in cached volumes on select nodes 700 in the cluster. In the illustrative embodiment, policy information associated with volume caching operations may be supplied by the administrator and stored in memory of management console 200. Exemplary policy information may include attributes of the nodes, operational events in cluster 100, and a preferred (pre-defined) configuration for a cached volume for instance.

Caching engine 300 may be operative to access the stored policy information to determine a set of nodes on which to implement volume caching. The determination may be performed by caching engine 300 determining a conformance between attributes of the set of nodes and the policy information, or the occurrence of an operational event indicated in the policy information at the set of nodes. Upon determining a need for a volume caching operation, caching engine 300 may generate requests for such caching operation and forward such requests to respective nodes 700 in cluster 100 for performance by such nodes. In this way, volume caching may be implemented in select nodes in an automated manner without requiring the administrator to possess detailed knowledge of cluster topology or node-specific features.

FIG. 1B is a schematic block diagram of an alternative cluster environment 150 in which volume caching may be implemented according to one embodiment of the present invention. Environment 150 may include multiple nodes 700 (node A, node B, node C) configured to provide access to volumes stored on storage 130. Each storage 130 may include one or more volumes, constituting volumes managed by a respective node (referred to as "origin volume") and volumes cached from other nodes. For instance, vol A may constitute an origin volume for node A, whereas cached vol B and cached vol C may constitute data cached from node B and node C, respectively.

Illustratively, node A and node B may implement volume caching and thus accelerate access to data stored at other nodes in cluster 150. That is, client requests received by node A and node B may be serviced using either an origin volume or cached volume at such nodes to avoid the need to request such data from the other nodes. In this way, bandwidth of cluster 150 may be conserved for servicing other data requests or for performing more critical cluster operations such as data backup or recovery between nodes.

In certain instances, however, it may be desirable to conserve processing resources at select nodes to perform more critical operations at such nodes. As an example, storage space at node C may approach a storage limit and thus it would be desirable to conserve storage resources at node C for storing new data on origin vol C rather than caching data from the other nodes. To that end, caching engine 300 may automatically implement volume caching at only nodes A and B and not at node C to optimize overall cluster performance without implementing volume caching at all nodes in cluster 150.

In one embodiment, caching engine 300 may implement volume caching at select nodes by accessing policy information stored in management console 200. For instance, stored policy information may include a node attribute associated with a related volume caching operation. In the present example, the attribute may involve a pre-defined amount of available storage space at a node (e.g., 60%). Caching engine 300 may then determine that only node A and B conform to the pre-defined amount of available storage space, thereby resulting in a request to generate a cached volume on node A and B only. Advantageously, since node C may fail to conform to the requisite amount of available storage space as indicated by the policy information, volume caching may be avoided on node C.

Figure 2:
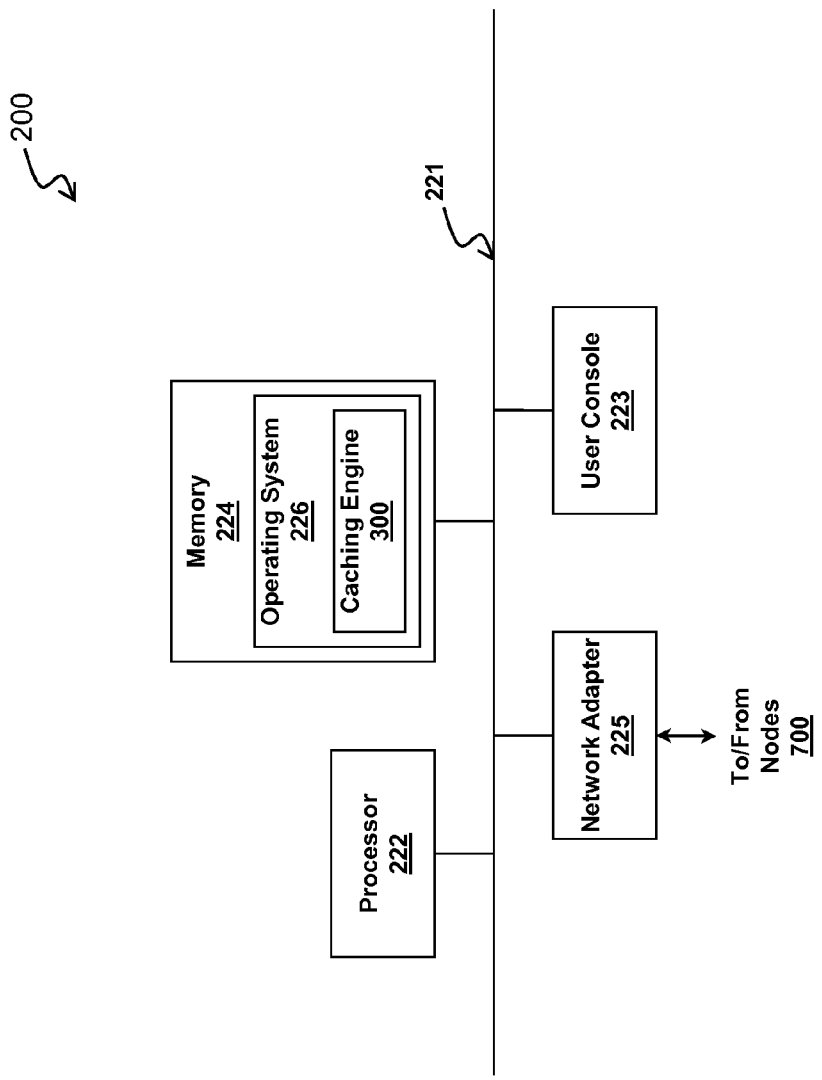
FIG. 2 is a schematic block diagram of an exemplary management console of a cluster implementing a novel caching engine according to one embodiment.

FIG. 2 is an exemplary schematic block diagram of management console 200 that may be implemented in the cluster environment of FIGS. 1A-B. Management console 200 may be implemented by a general- or special-purpose computer comprising a processor 222, a memory 224, a network adapter 225, and a user console 223 interconnected by a system bus 223.

Memory 224 illustratively comprises storage locations that are addressable by processor 222 and network adapter 225 for storing program instructions and data used in some embodiments. Processor 222 and adapter 225 may, in turn, comprise processing elements and/or logic circuitry configured to execute the instructions and manipulate the data stored in memory 224. In some embodiments, memory 224 may comprise a form of random access memory (RAM) comprising "volatile" memory that is generally cleared by a power cycle or other reboot operation.

Communication between the nodes and management console 200 may be carried out via network adapter 225, which comprises a plurality of ports adapted to couple management console 200 and the nodes over point-to-point links, wide area networks, virtual private networks implemented over a public network (Internet) or a shared local area network. Network adapter 225 thus may comprise the mechanical, electrical and signaling circuitry needed to connect the node to the network. Illustratively, network 140 of FIG. 1A-B may be embodied as an Ethernet network or a Fibre Channel (FC) network. Management console 200 may communicate with the nodes over network 140 by exchanging discrete frames or packets of data according to pre-defined protocols, such as TCP/IP.

Illustratively, management console 200 may embody a centralized management interface between nodes in the cluster (e.g., nodes 700) and the administrator of the cluster by executing an operating system 226 resident in memory 224. Operating system 226 may functionally organize management console 200 to provide cluster management services by e.g., communicating with an M-host of the nodes to request or supply cluster information, as well as communicating with N- and D-modules of the nodes to request the performance of cluster operations. It will be apparent to those skilled in the art that other processing and memory means, including various computer readable media, may be used for storing and executing program instructions pertaining to the invention described herein. In some embodiments, operating system 300 may comprises a plurality of software layers (including caching engine 300) that are executed by processor 222.

In the illustrative embodiment, caching engine 300 may be implemented in management console 200 as program instructions stored in memory 224 and executed by processor 222 to implement volume caching at select nodes in the cluster. To that end, caching engine 300 may be functionally organized to store policy information to memory 224, determine a set of nodes on which to cache volumes based on the stored policy information, and request a volume caching operation to be performed on a node of the cluster. Advantageously, volume caching may be performed across select nodes in the cluster without an administrator implementing volume caching based on the administrator's knowledge of the cluster topology and node-specific features.

User console 223 may embody a monitor, keyboard, or other user interfaces, in certain embodiments, to allow the administrator to interface with management console 200. In the present invention, the administrator may interface at user console 223 to input policy information for storage in memory 224. Examples of policy information may include node attributes, operational events, and a pre-defined configuration for a cached volume. Details of the policy information are described further with respect to FIG. 4.

II. Novel Caching Engine

Figure 3:
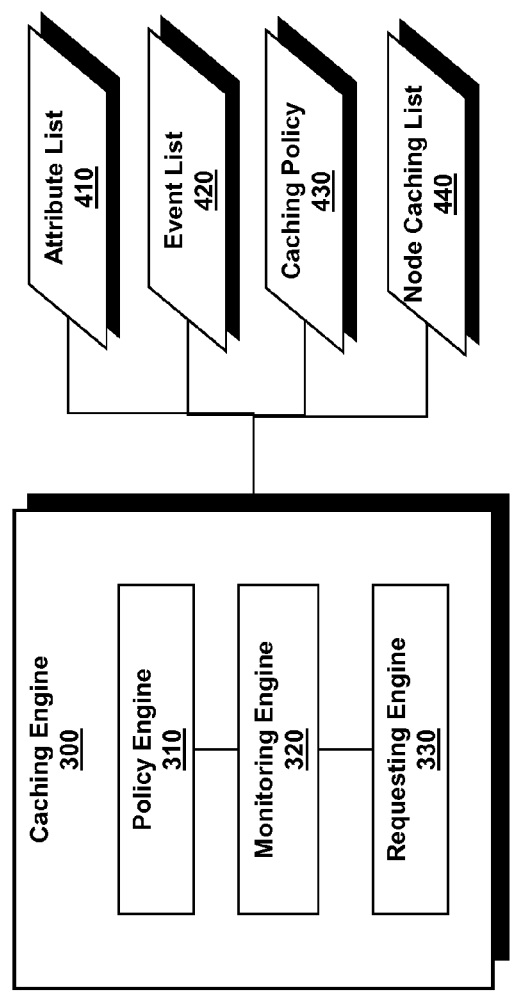
FIG. 3 shows a schematic block diagram of the caching engine accelerating access to remote data in accordance with one embodiment of the present invention.

FIG. 3 shows a block diagram of caching engine 300 configured to implement policy-based volume caching in a cluster (e.g., cluster 100) according to one embodiment. Preferably, caching engine 300 may be implemented by one or more software-executing processors of a management console (management console 200) in the cluster. However, caching engine 300 may be implemented by a combination of software-executing processors, hardware and firmware in other embodiments, and may further be implemented in various components of the cluster to distribute processing tasks amongst the cluster. In addition, caching engine 300 may not be limited to the illustrative embodiment described herein, and may include a different number and/or different types of components to carry out the operations of caching engine 300 consistent with teachings of the present technique.

As shown in FIG. 3, functional components of caching engine 300 may include a policy engine 310, a monitoring engine 320, and a requesting engine 330 in accordance with one embodiment. Policy engine 310 may be operative to manage data structures which store information associated with volume caching operations (policy information) performed by caching engine 300. Illustratively, policy engine 310 may implement one or more data structures such as attribute list 410, event list 420, caching policy 430, and a node caching list 440 for storing policy information.

Attribute list 410, event list 420, and caching policy 430 may be generated using information input by an administrator interfacing at the management console. Once received, policy engine 310 may store the inputs to respective data structures. To that end, attribute list 410 may store a set of node attributes of import to the administrator in accelerating performance of the cluster. Event list 420 may store identifiers for operational events in the cluster to indicate the need for a volume caching operation upon the occurrence of the operational event. Caching policy 430 may include a pre-defined configuration for a cached volume with which to generate a cached volume on a node. Node caching list 440 may, in contrast, store a set of identifiers for nodes on which to perform a volume caching operation based on information stored in attribute list 410 and event list 420. Details of the exemplary data structures are described in more detail below with regard to FIG. 4.

Monitoring engine 320 may be operative to determine a need for a volume caching operation on a node of the cluster. A volume caching operation may constitute the generation of a new cached volume or the deletion of an existing cached volume for example. In one embodiment, during initialization of the cluster or a node in the cluster, monitoring engine 320 may determine whether to generate a cached volume on a node in the cluster by accessing the attributes in attribute list 410. Monitoring engine 320 may further request such attributes for a node in the cluster from e.g., the operating system of the management console. A comparison operation may then be performed by monitoring engine 320 to determine whether the attributes in attribute list 410 correspond to (e.g., match) attributes of the nodes as supplied by the operating system. When a match exists, monitoring engine 420 may store an identifier for such node, such as a node name, to node caching list 440 for requesting a volume caching operation at the node at a later point in time.

In some embodiments, an operational event such as a change in a configuration of the cluster or a node may also result in a volume caching operation in the cluster. Monitoring engine 320 may thus determine whether an event has occurred to determine a need for a volume caching operation. In one embodiment, monitoring engine 320 may periodically request a node or cluster configuration from the operating system based on e.g., a preferred configuration in event list 420, and store the configuration in memory. A configuration requested at a later point in time may then be compared with a previous configuration to determine a difference between configurations, thereby resulting in an occurrence of an operational event. Upon determining the occurrence of an event, node caching list 440 may be updated by monitoring engine 320 to indicate a volume caching operation to be performed on the node.

In some embodiments, an operational event may involve the realization of a threshold (e.g., storage limit, storage space limit) or the existence of a cluster configuration (e.g., caching on all nodes), each referred to herein as a "system condition". Monitoring engine 320 may thus request an attribute from the storage operating system of one or more nodes or of the cluster based on event list 420, and use such information to determine whether a system condition exists to constitute an occurrence of an operational event. Upon the determination of such event, monitoring engine 320 may update node caching list 440 with one or more node names to indicate the occurrence of the event and the need to perform a volume caching operation on the indicated node(s). Further, based on a volume caching operation associated with the operational event as indicated in event list 420, monitoring engine 320 may associate each of the node names with a related volume caching operation according to event list 420.

Requesting engine 330 may be implemented in caching engine 300 to initiate a volume caching operation at a node of the cluster. To that end, requesting engine 340 may generate a request for each node in node caching list 440 to initiate the volume caching operation at the select set of nodes. In one example, the volume caching operation may involve generating a new cached volume at a node, so requesting engine 330 may include the pre-defined configuration stored in caching policy 430 to produce a cached volume having the pre-defined configuration at the node. In another example, the volume caching operation may involve the deletion of one or more cached volumes at the node, so requesting engine 430 may simply request the deletion of such cached volume(s) on the node in its request. Each request may then be forwarded by requesting engine 330 to the appropriate node to carry out the requested operation.

Figure 4:
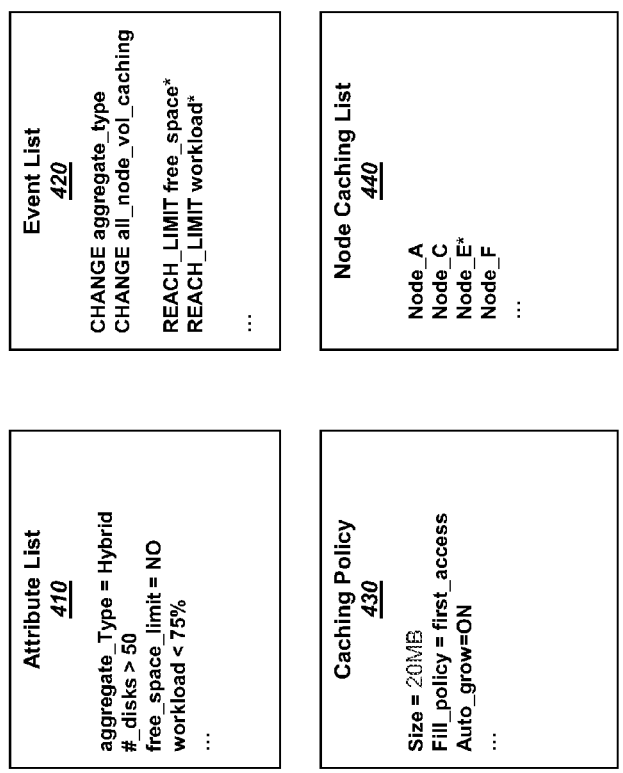
FIG. 4 shows a diagram illustrating novel data structures implemented by the caching engine of FIG. 3 for storing policy information accessed by the caching engine according to one embodiment.

FIG. 4 illustrates exemplary policy information stored in data structures 410, 420, 430, 440 in further detail. Node attributes stored in attribute list 410 may include a set of attributes of import to the administrator for determining, by caching engine 300, on which select nodes to generate a cached volume. As an example, a node attribute may include a type of storage object supported by the node (e.g, hybrid vs. regular aggregate), a pre-defined number of storage devices constituting the node's storage subsystem, an amount of available storage space on the node, or a workload of the node. Each node attribute may be input by the administrator interfacing at the management console and stored by policy engine 310 to attribute list 410 for enabling monitoring engine 320 to determine the set of nodes on which to generate a cached volume.

Events stored in event list 420 may similarly be input by the administrator interfacing at the management console. Exemplary events may include a change in a particular node configuration (e.g., support for hybrid aggregate), a realization of a threshold (e.g., maximum workload, available space limit), or an existence of a system condition within the cluster (e.g., cached volumes on all nodes) or a node of the cluster. The administrator may also supply a related volume caching operation (e.g., generate cached volume, delete cached volume) with each event to indicate a pre-defined volume caching operation to be performed upon the occurrence of such event. Each event may thus be associated with a volume caching operation in event list 420 to indicate a type of request to be generated by requesting engine 330. Preferably, event list 420 may be generated by policy engine 310 upon initialization of caching engine 300, and may be accessed by monitoring engine 320 to determine a need for a volume caching operation.

A preferred configuration for a cached volume may be stored as a pre-defined configuration for a cached volume in caching policy 430. Advantageously, the pre-defined configuration may be stored at the management console so that the administrator need only interface at a centralized management interface to implement such configuration across select nodes in the cluster. To that end, caching policy 430 may indicate an initial storage size of a cached volume (e.g., 20 MB), a data fetching or "fill" policy (e.g., when first requested by a client or "first access"), a policy to increase the size of the cached volume upon reaching a storage limit, or other configuration elements for a cached volume. The pre-defined configuration stored in caching policy 430 may then be accessed by requesting engine 330 when requesting the generation of a cached volume at a node.

Node caching list 440 may include a set of node names on which to generate or delete cached volumes. Node names may be stored to node caching list 440 by monitoring engine 320 when a configuration of a node is in conformance with information of attribute list 410, or when an operational event is determined to have occurred in accordance with event list 420. In certain embodiments, node caching list 440 may include a delete indicator to indicate the need to delete cached volumes at a particular node. For instance, an event such as the realization of a workload limit of a node (e.g., REACH_LIMIT workload) may be associated with a delete cached volume operation to indicate a need to eliminate processing overhead associated with the cached volume at the node.

In the illustrative embodiment, components of caching engine 300 may determine a need for a volume caching operation at select nodes A, C, E, and F in one exemplary cluster as indicated by the respective node names in node caching list 440. It will be noted that caching engine 300 may have determined e.g., a non-conformance between attributes of other nodes B, D (not shown) and the policy information to thereby result in the absence of such node names in node caching list 440. Further, monitoring engine 320 may determine the realization of a workload limit at node E based on event list 420, resulting in a need to delete cached volumes at node E. Accordingly, node E may be associated with an identifier (*) in node caching list 40 for enabling requesting engine 330 to request the deletion of cached volumes at node E.

Since information related to volume caching operations may be stored in the exemplary data structures, the administrator need not rely on the administrator's own knowledge of the cluster topology and specific features for each node to implement volume caching across select nodes in the cluster. Instead, policy information may be input by the administrator at a central management interface to implement the desired policy across select nodes in the cluster automatically. In addition, changes in node configuration or system conditions within the cluster may automatically result in a volume caching operating to optimize cluster performance using the exemplary novel technique.

III. Technique for Policy-Based Volume Caching

Figure 5:
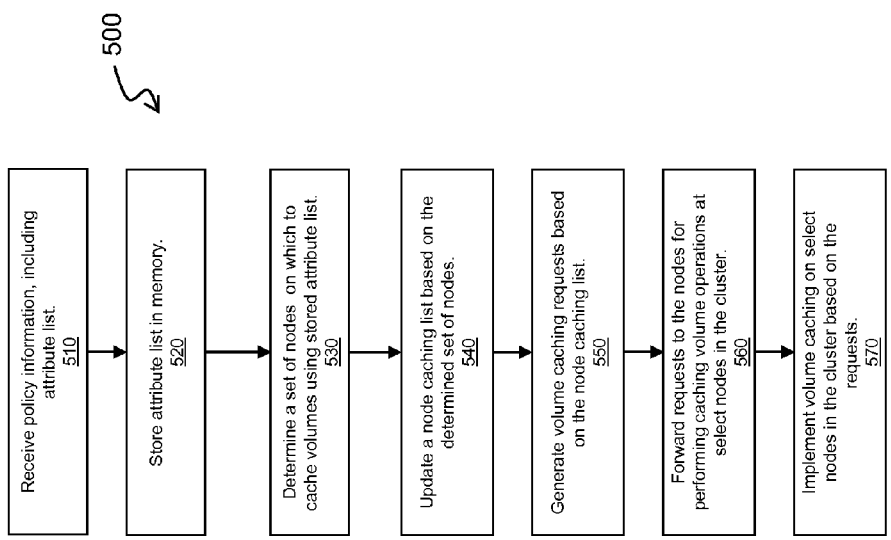
FIG. 5 shows a flow diagram of a process for implementing volume caching on select nodes in the cluster according to one embodiment.

FIG. 5 shows a block diagram of a process 500 for optimizing performance of the cluster by generating cached volumes on select nodes of the cluster using the novel technique. Preferably, process 500 may be performed by components of a caching engine (e.g., caching engine 300) selectively implementing volume caching on nodes in the cluster in a policy-based manner (e.g., using policy information stored at a management console). It will be noted that the steps of process 500 may be performed in the same or a different sequence as illustratively described and further may be performed in combination with one or more other steps of process 500 in certain embodiments. In addition, process 500 may include more or less steps than described in the illustrative embodiment, and thus it will be appreciated that process 500 may be limited to the illustrative embodiment.

At step 510, policy information associated with volume caching operations in the cluster may be received by the caching engine. In one embodiment, policy information may be input by a user interfacing at a management console implementing the caching engine (e.g., management console 200), and may include information such as node attributes and a cached volume configuration for example. In other embodiments, such information may be supplied automatically to the caching engine by another device (e.g., client 180) connected to the management console.

Once received, a policy engine (e.g., policy engine 310) of the caching engine may store the policy information in data structures generated by the caching engine (step 520). For instance, the policy engine may store node attributes in an attribute list (e.g., attribute list 410), operational events in an event list (e.g., event list 420), and a cached volume configuration in a caching policy (e.g., caching policy 430). It will be appreciated that the policy engine may implement different data structures other than the exemplary data structures so the novel technique is not limited to the number and type of data structures described herein.

A monitoring engine (e.g., monitoring engine 320) of the caching engine may be operative at step 530 to determine a set of nodes on which to cache volumes. In one embodiment, the monitoring engine may retrieve a set of node attributes from the attribute list constituting the stored policy information. The monitoring engine may further request attributes of nodes in the cluster from the operating system of the management console for comparing the nodes' attributes with the stored attribute list. A need for a volume caching operation may then be determined by the monitoring engine comparing the attributes received from the operating system and attributes in the stored attribute list.

Matches between node attributes received from the operating system and the attributes in the attribute list may result in a need to perform a volume caching operation on the set of nodes for which a match is determined. The monitoring engine may thus update a node caching list (e.g., node caching list 540) by storing a node name for each node in the set to indicate a need for a volume caching operation at such nodes (step 540). The node caching list may be generated by the policy engine during initialization of the caching engine, for example, which may thereafter be accessed by a requesting engine (e.g., requesting engine 330) of the caching engine to request the performance of such operations at the nodes.

To that end, the requesting engine may access the node caching list to generate requests for volume caching operations at the nodes (step 550). When generating a request for a cached volume at a node, the requesting engine may access the caching policy to retrieve a pre-defined configuration and include the pre-defined configuration in the request to generate the cached volume. Requests for a volume caching operation at select nodes in the cluster may then be forwarded by the requesting engine to respective nodes (step 560).

Upon receipt of such request, select nodes in the cluster may perform a volume caching operation based on the stored policy information (step 570). In one example, upon receipt of a request to generate a cached volume, a node may generate the cached volume using the caching policy provided in the request from the requesting engine. For instance, if the caching policy includes a particular size and fill policy, then the node may generate a cached volume implementing the particular size and fill policy. Thereafter, requests received by the node and targeted for remote volumes may be serviced using the cached volume.

In other examples, a node may receive a request to delete cached volumes at the node to thereby conserve resources at the node. As a result, the node may determine the cached volumes at the node and delete such volumes (e.g., free up storage space and stop processing tasks associated with the cached volume). In this way, volume caching may efficiently be implemented on select nodes throughout the cluster based on policy information managed by the caching engine.

In some embodiments, the caching engine may initiate a volume caching operation based on an operational event of the cluster. For instance, the operational event may involve the realization of a workload limit, the availability of additional storage space at a node, the configuration of a new network entry point at a node (e.g., when migrating to a node a network access port from another node), or another operational event which alters the operational state of a node or the cluster. Advantageously, the novel technique may be implemented in the cluster to determine the changed state and initiate a volume caching operation as a result of the changed state. The volume caching operation may be initiated to accelerate performance of the cluster by implementing cached volumes on additional nodes or reduce processing overhead at select node by deleting cached volumes.

Figure 6:
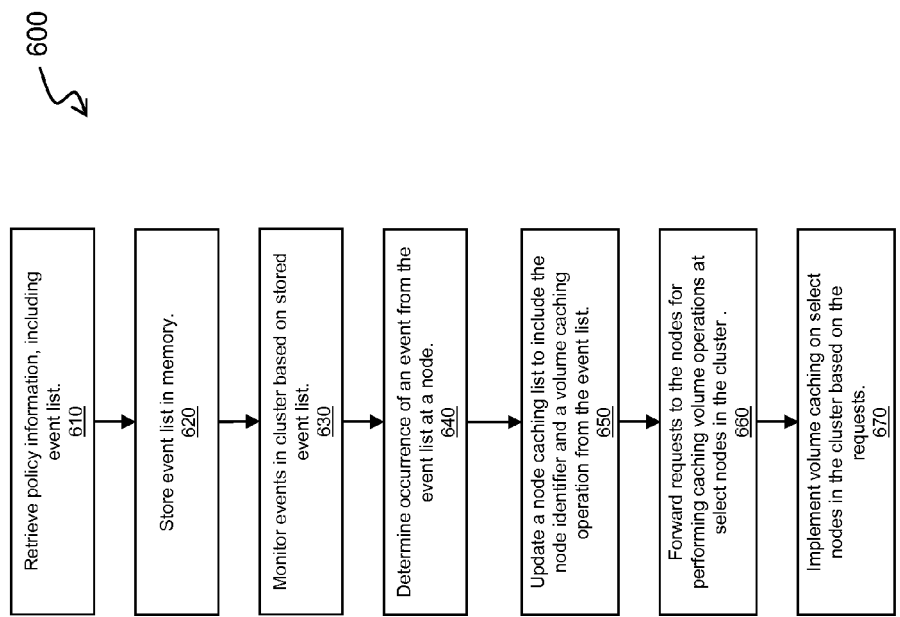
FIG. 6 shows a flow diagram of a process for requesting a volume caching operation at a node based on the occurrence of an operational event at the node.

FIG. 6 shows a block diagram of a process 600 for initiating a volume caching operation upon the occurrence of an operational event in the cluster. Process 600 may be performed by components of the caching engine (e.g., caching engine 300), and may be performed in the same or a different sequence as shown herein. In addition, process 600 may include more or less steps than described in the illustrative embodiment, and thus it will be appreciated that process 600 may be limited to the illustrative embodiment.

At step 610 of process 600, the caching engine may receive operational event information of the cluster or a node in the cluster. In one embodiment, such information may be input by a user interfacing at the management console, and may include operational events such as a particular node configuration, a realization of a threshold, or an existence of an operating condition within the cluster for example. In other embodiments, such information may be supplied automatically to the caching engine by another device (e.g., client 180) connected to the management console. Once received, the policy engine of the caching engine may store the policy information in a data structure such as an event (e.g., event list 420) generated by the caching engine (step 620).

Thereafter, the monitoring engine may be operative to monitor events in the cluster at step 630. In one embodiment, the monitoring engine may monitor events by periodically requesting information of the cluster or a node from the operating system of the management console, the requested information corresponding to events indicated in the event list. Information requested by the monitoring engine may include a configuration, an operating status, a performance metric, or any other information indicated in the event list. The received information may then be processed by monitoring engine to determine whether an operational event has occurred (step 640). In one example, the monitoring engine may store configuration information in memory and compare a previous configuration with a current configuration to determine whether a change in configuration has occurred to result in an operational event. In other examples, the monitoring engine may determine a threshold has been realized or an operating status exists to constitute an operational event.

Upon determining an operational event has occurred, the monitoring engine may update the node caching list by storing the node name related to the operational event to the node caching list (step 650). A volume caching operation associated with the subject event as indicated in the event list may also be stored to the node caching list to indicate the particular volume caching operation to be performed as a result of the event. For instance, upon determination of a node realizing a workload threshold, the node name may be associated with an indicator to delete a cached volume in the node caching list. In another example, upon determination of a node realizing an available storage threshold, the node name may be associated with an indicator to generate a cached volume.

At step 660, the requesting engine of the caching engine may generate requests for nodes in the list according to the indicated volume caching operation associated therewith, and forwarded to the respective nodes. Upon receipt of the request, select nodes may then perform the requested operation (step 670). In one embodiment, a node may delete the cached volumes on the node to reduce processing overhead at the node. In another embodiment, a node may generate one or more cached volumes to accelerate performance of the cluster when servicing access requests targeted for remote volumes. Using process 600, the caching engine may thus perform volume caching operations on select nodes in the cluster upon the occurrence of operational events to dynamically optimize cluster performance.

IV. Node Carrying Out Policy-Based Volume Caching

Figure 7:
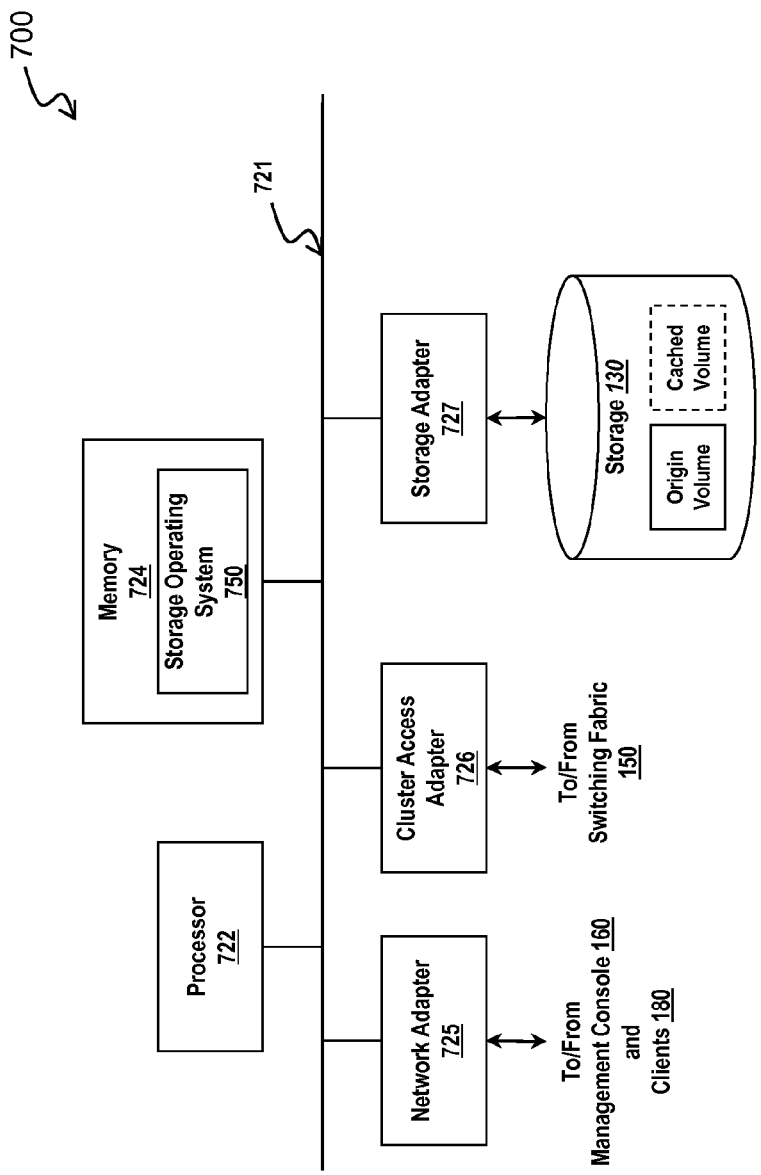
FIG. 7 is a schematic block diagram of an exemplary select node in the cluster that may automatically implement volume caching as requested by the caching engine.

FIG. 7 is a schematic block diagram of an exemplary select node 700 in the cluster that may carry out a volume caching operation as requested by the caching engine in accordance with one embodiment. Node 700 may illustratively be embodied as a storage system comprising one or more processors 722, a memory 724, a network adapter 725, a cluster access adapter 726, and a storage adapter 727, interconnected by a system bus 721.

Memory 724 illustratively comprises storage locations that are addressable by processor 722 and adapters 725, 726, 727 for storing program instructions and data used in some embodiments. The processors and adapters may, in turn, comprise processing elements and/or logic circuitry configured to execute the instructions and manipulate the data stored in memory 724. In some embodiments, memory 724 may comprise a form of random access memory (RAM) comprising "volatile" memory that is generally cleared by a power cycle or other reboot operation.

Network adapter 725 may comprise a plurality of ports adapted to couple node 700 to one or more clients 180 over point-to-point links, wide area networks, virtual private networks implemented over a public network (Internet) or a shared local area network. Network adapter 725 thus may comprise the mechanical, electrical and signaling circuitry needed to connect node 700 to network 180. Illustratively, network 140 may be embodied as an Ethernet network or a Fibre Channel (FC) network. Each client 180 may communicate with node 700 over network 140 by exchanging discrete frames or packets of data according to pre-defined protocols, such as TCP/IP.

Cluster access adapter 726 may comprise a plurality of ports adapted to couple node 700 to other nodes of the cluster through cluster switching fabric 150. In the illustrative embodiment, Ethernet may be used as the clustering protocol and interconnect media, although it will be apparent to those skilled in the art that other types of protocols and interconnects may be utilized within the cluster architecture described herein. In embodiments where node 700 may implement an N- or D-module (e.g., N-module 810, D-module 850) in providing storage services, cluster access adapter 726 may be utilized by such modules for communicating with N- and D-modules of other nodes in the cluster. To that end, multiple processors 722 may implement node 700, such that one processor may execute the functions of the N-module, while another processor executes the functions of the D-module.

Illustratively, node 700 may embody a storage system executing a storage operating system 750 that preferably implements a high-level layer of abstraction (e.g., file system) to logically organize the information as a hierarchical structure of storage objects, such as file system, volumes, directories, and files on storage 130. Each file, for instance, may be implemented as a set of data structures, i.e., disk blocks, configured to store information such as the actual data for the file. Blocks may further be organized as a volume, where each volume may be, although is not necessarily, associated with its own file system.

To that end, storage adapter 728 may cooperate with storage operating system 750 executing on node 700 to access information requested by clients 180. The information may be stored on any type of writable storage media such as video tape, optical, DVD, disk, magnetic tape, bubble memory, electronic random access memory, micro-electro mechanical storage media, solid state storage (e.g., flash memory), and any other similar media adapted to store information. As illustratively described, information may be stored on disks constituting storage 130 configured as storage array 120. Storage adapter 728 may thus comprise a plurality of ports having input/output (I/O) interface circuitry that couples to disks over an I/O interconnect arrangement, such as a conventional high-performance, FC link topology.

Storage of information on storage array 120 may preferably be implemented as one or more volumes (e.g., origin volumes, cached volumes) that comprise a collection of physical disks cooperating to define an overall logical arrangement of volume block number (vbn) space on respective volume(s). The disks within a volume/file system may typically be organized as one or more groups embodying Redundant Array of Independent Disks (RAID) arrays. RAID implementations may enhance the reliability/integrity of data storage through the redundant writing of logical data "stripes" across a given number of physical disks in the RAID group, and the appropriate storing of parity information associated with the striped data.

Storage operating system 750, portions of which are typically resident in memory 724 and executed by processor 722, may functionally organize node 700 by invoking storage operations in support of the storage services implemented by node 700. It will be apparent to those skilled in the art that other processing and memory means, including various computer readable media, may be used for storing and executing program instructions pertaining to the invention described herein. In some embodiments, storage operating system 750 may comprise a plurality of software layers (including a layer for generating a cached volume) that are executed by processor 722.

To facilitate access to storage objects on storage 130, storage operating system 750 may implement a file system that cooperates with one or more virtualization modules to "virtualize" the storage space provided by storage 130. The file system may logically organize the information as a hierarchical structure of named volumes, directories and files on storage 130. Each file may be implemented as set of disk blocks configured to store information, such as data, whereas a directory may be implemented as a specially formatted file in which names and links to other files and directories are stored. In addition, the virtualization module(s) may allow the file system to logically organize information as a hierarchical structure of blocks on the disks that are exported as named logical unit numbers (luns).

In the illustrative embodiment, storage operating system 750 may embody the Data ONTAP® software operating system available from NetApp, Inc., Sunnyvale, Calif. that implements a Write Anywhere File Layout (WAFL®) file system. However, it is expressly contemplated that any storage operating system may be implemented in accordance with the principles described herein. Accordingly, where the term "WAFL" is employed, it should be taken broadly to refer to any storage operating system that is otherwise adaptable to the teachings of the present invention.

Storage operating system 750 may moreover comprise a series of software layers organized to form an integrated network protocol stack or, more generally, a multi-protocol layer (e.g., N-module 810) for providing data paths to data stored on node 700 using e.g., block and file access protocols. The multi-protocol engine may also facilitate communication across cluster switching fabric 150 between nodes in the cluster. The multi-protocol engine may thus include a media access layer embodying network drivers (e.g., gigabit Ethernet drivers) that interfaces to network protocol layers, such as an Internet Protocol (IP) layer and its supporting transport mechanisms, a TCP layer, and a User Datagram Protocol (UDP) layer for instance.

In one embodiment, a file system protocol layer may provide multi-protocol file access and, to that end, may include support for one or more protocols such as Direct Access File System (DAFS), NFS, CIFS, and Hypertext Transfer Protocol (HTTP) protocols. A virtual interface layer may provide direct access transport (DAT) capabilities, such as RDMA, as required by the DAFS protocol. An iSCSI driver layer may provide block protocol access over the TCP/IP network protocol layers, while an FC driver layer may receive and transmit block access requests and responses to and from node 700. The FC and iSCSI drivers may provide FC- and iSCSI-specific access control to the blocks and, thus, manage exports of luns to iSCSI and/or FCP when accessing blocks on node 700.

Storage operating system 750 may further include a series of software layers organized to form a storage server (e.g., D-module 850) to provide data paths for accessing information on storage devices (e.g., disks) constituting storage 130. To that end, the storage server may include a file system, a RAID system, and a disk driver system. The RAID system may manage the storage and retrieval of information to/from storage 130 in accordance with I/O operations, while the disk driver system may implement a disk access protocol such as, e.g., the SCSI protocol. The file system may implement a virtualization system implementing a SCSI target module disposed between the FC and iSCSI drivers and the file system to provide translations between the block (lun) space and the file system space.

The file system may illustratively be a message-based system that allocates storage space as array 120 on storage 130 and controls the layout of information on array 120. The file system further provides volume management capabilities for accessing information stored on storage 130. These volume management capabilities may include the organization of data as volumes on storage 130, the initial configuration of such volumes (e.g., implementing a volume size requested by caching engine), and other volume management capabilities (e.g., increasing the size of a volume). Preferably, the file system manages volumes by implementing the WAFL file system having an on-disk format representation that is block-based using, e.g., 4 kilobyte (kB) blocks and using index nodes ("inodes") to identify files and file attributes (such as creation time, access permissions, size and block location) organized within volumes in storage 130. Illustrative, a storage object such as an inode file may be used to describe the layout of the file system and may be retrieved from storage 130 using a file handle, i.e., an identifier that includes an inode number.

All inodes of the write-anywhere file system may be organized into the inode file. A file system (fs) info block may specify the layout of information in the file system and may include an inode of a file that includes all other inodes of the file system. Each volume may have an fsinfo block that may be stored at a fixed or otherwise determinable location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, node 700 may receive an access request from client 180 which may be forwarded as a packet over network 140 and to node 700 where it is received at network adapter 725. A network driver (of the multi-protocol engine) may process the packet based on its respective protocol and forward the processed packet to the file system. Here, the file system may load (retrieve) the requested data from storage 130 if it is not resident "in core", i.e., in memory 724. If the information is not in memory, the file system may index into the inode file using the inode number to access an appropriate entry and retrieve a logical vbn. The file system may then pass a message structure including the logical vbn to the RAID system to be mapped to a disk identifier and disk block number (disk,dbn). A disk driver may then access the dbn from the specified disk and may load the requested data block(s) in memory 724 for processing by node 700. Upon completion of the access request, storage operating system 750 may return a reply to client 180 over network 140.

In some embodiments, node 700 may receive a request from a caching engine (e.g., caching engine 300) to perform a volume caching operation. The request may embody a packet forwarded by the caching engine over network 140 and to node 700 where it is received at network adapter 725. A network driver (of the multi-protocol engine) may process the packet based on a respective protocol and forward the processed packet to storage operating system 750. When the volume caching operation involves the generation of a cached volume, the storage operating system may request data for volumes on the other nodes in the cluster and forward the data to the file system for organization as a cached volume on storage 130. When the volume caching operation involves the deletion of cached volumes on node 700, storage operating system 750 may forward the packet to the file system for e.g., updating the inode file to remove references to the cached volumes to be deleted. Upon completion of the request, storage operating system 750 may return a reply to the caching engine over network 140. Thereafter, requests for remote data received by node 700 may be serviced using the cached volumes implemented thereon.

It should be noted that the software "path" through the storage operating system layers described above may alternatively be implemented in hardware. That is, in an alternate embodiment of the invention, a data path may be implemented as logic circuitry embodied within a field programmable gate array (FPGA) or an application specific integrated circuit (ASIC). This type of hardware implementation may increase the performance of the storage service provided by node 700 in response to a request issued by client 180 or the caching engine. Moreover, in another alternate embodiment, the processing elements of adapters 725, 726, 727 may be configured to offload some or all of the packet processing and storage access operations, respectively, from processor 222, to increase the performance of the storage service provided by node 700. It is thus expressly contemplated that the various processes, architectures and procedures described herein can be implemented in hardware, firmware or software-executing processors.

As used herein, the term "storage operating system" generally refers to the computer-executable code operable on a computer to perform a storage function that manages data access and may, in the case of a node 700, implement data access semantics of a general purpose operating system. Storage operating system 750 may also be implemented as a microkernel, an application program operating over a general-purpose operating system, such as UNIX® or Windows XP®, or as a general-purpose operating system with configurable functionality, which may be configured for storage applications as described herein.

In addition, it will be understood to those skilled in the art that the invention described herein may apply to any type of special-purpose or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should further be taken broadly to include such arrangements in addition to any subsystems configured to perform a storage function and associated with other equipment or systems. It should be noted that while this description is written in terms of a write any where file system, the teachings of the present invention may be utilized with any suitable file system, including but not limited to, a write in place file system.

As described herein, the novel technique may advantageously overcome deficiencies with the prior art by enabling a volume caching operation to be automatically be performed at select nodes in the cluster based on policy information stored at a management console. The administrator of the clustered storage system need not possess detailed knowledge of the cluster topology, nor node-specific features, to selectively implement volume caching on the nodes for accelerating data access. Instead, the administrator may simply input policy information to a centralized management interface for a cluster for implementation across the cluster. As the cluster change over time to meet changing storage needs, the novel technique of policy-based volume caching may provide a more adaptive solution for optimizing cluster performance without unwieldy interaction by the administrator.

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable non-transitory storage medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those skilled in the art would further appreciate that the various illustrative logical blocks, modules, circuits, techniques, or method steps of embodiments described herein may be implemented as electronic hardware, software-executing computer, firmware or combinations thereof. To illustrate this interchangeability of hardware and software-executing processor, various illustrative components, blocks, modules, circuits, and steps have been described herein generally in terms of their functionality. Whether such functionality is implemented as hardware or software-executing processor depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A computer-implemented method comprising:
   after receiving policy information that indicates criteria for volume caching operations in a storage system cluster, determining attribute information of nodes in the storage system cluster, wherein the criteria comprises node attributes, operational events, and a cached volume configuration;
   determining, in relation to a first node, that the criteria indicated by the received policy information are satisfied based, at least in part, upon the determined attribute information;
   determining, in relation to a second node, that the criteria indicated by the received policy information are satisfied based, at least in part, upon the determined attribute information;
   requesting that the first node of the nodes perform a first volume caching operation responsive to determining that the criteria relating to the first node are satisfied based, at least in part, on the attribute information for the first node; and
   requesting that the second node of the nodes perform a second volume caching operation responsive to determining that the criteria relating to the second node are satisfied based, at least in part, on the attribute information for the second node.

2. The computer-implemented method of claim 1, wherein requesting that the first node perform the first volume caching operation comprises requesting that the first node delete a cached volume at the first node, wherein the first subset of the criteria for volume caching corresponds to a delete cached volume operation.

3. The computer-implemented method of claim 1, wherein requesting that the second node perform the second volume caching operation comprises requesting that the second node create a cached volume at the second node in accordance with a pre-defined configuration from the policy information, wherein the second subset of the criteria for volume caching corresponds to a create cached volume operation.

4. The computer-implemented method of claim 1 further comprising:
   determining that the attribute information for a third node of the nodes has changed;
   determining that the changed attribute information for the third node satisfies the criteria for volume caching; and
   requesting that the third node perform the first volume caching operation in response to determining that the changed attribute information for the third node satisfies the criteria for volume caching.

5. The computer-implemented method of claim 1 further comprising periodically requesting the nodes of the storage system cluster for any updates to the attribute information.

6. The computer-implemented method of claim 1, wherein the policy information also indicates a first set of nodes of the nodes.

7. The computer-implemented method of claim 6, wherein the policy information specifies a volume caching operation for each of the first set of nodes, the method further comprising requesting that each of the first set of nodes perform the specified volume caching operation.

8. The computer-implemented method of claim 1, wherein the criteria for volume caching are based on at least one of a storage space related threshold, a cluster configuration, and a node configuration.

9. The computer-implemented method of claim 1 further comprising determining from the policy information a list of nodes and a list of node attributes, wherein determining that the first subset of criteria for volume caching and the second subset of criteria for volume caching are satisfied uses the list of nodes and the list of node attributes.

10. A non-transitory computer readable medium having instructions stored therein, the instructions to:
    determine attribute information for nodes in a storage system cluster after receiving policy information that indicates criteria for volume caching operations in the storage system cluster, wherein the criteria comprises node attributes, operational events, and a cached volume configuration;
    determine which of the criteria for volume caching is satisfied based, at least in part, upon the determined attribute information; and
    for the criteria for volume caching that are satisfied, request nodes with attribute information related to satisfaction of the criteria for volume caching to perform a volume caching operation corresponding to the criteria for volume caching.

11. The non-transitory computer readable storage medium of claim 10, wherein the attribute information indicates for each of the nodes:
    an amount of available storage space of the node;
    a type of storage object supported by the node;
    a number of storage devices of the node; and
    a workload of the node.

12. The non-transitory computer readable medium of claim 10, wherein the instructions to request nodes with attribute information related to satisfaction of the criteria for volume caching to perform a volume caching operation corresponding to the criteria for volume caching comprises instructions to request a node to delete a cached volume at the node.

13. The non-transitory computer readable medium of claim 10, wherein the instructions to request nodes with attribute information related to satisfaction of the criteria for volume caching to perform a volume caching operation corresponding to the criteria for volume caching comprises instructions to request a node to generate a cached volume at the node in accordance with a pre-defined configuration from the policy information.

14. The non-transitory computer readable medium of claim 10 further having instructions to:
    determine that attribute information for a node of the nodes has changed;
    determine whether the changed attribute information satisfies the criteria for volume caching; and
    request that the node with the changed attribute information perform a volume caching operation corresponding to the criteria for volume caching satisfied by the changed attribute information in response to a determination that the changed attribute information satisfies the criteria for volume caching.

15. The non-transitory computer readable medium of claim 10 further having instructions to periodically request the nodes of the storage system cluster for attribute information updates.

16. An apparatus comprising:
    a processor;

a network interface; and a computer readable medium having instructions stored thereon, the instructions executable by the processor to cause the apparatus to, determine attribute information for nodes in a storage system cluster after receiving policy information that indicates criteria for volume caching operations in the storage system cluster, wherein the criteria comprises node attributes, operational events, and a cached volume configuration;

determine which of the criteria for volume caching is satisfied based, at least in part, upon the determined attribute information; and for criteria for volume caching that are satisfied, request nodes with attribute information related to satisfaction of the subset of criteria for volume caching to perform a volume caching operation corresponding to the criteria for volume caching.

17. The apparatus of claim 16, wherein the attribute information indicates for each of the nodes:

an amount of available storage space of the node;
a type of storage object supported by the node;
a number of storage devices of the node; and
a workload of the node.

18. The apparatus of claim 16, wherein the instructions executable by the processor to cause the apparatus to request nodes with attribute information related to satisfaction of the criteria for volume caching to perform a volume caching operation corresponding to the criteria for volume caching comprises instructions executable by the processor to cause the apparatus to request a node to delete a cached volume at the node.

19. The apparatus of claim 16, wherein the instructions executable by the processor to cause the apparatus to request nodes with attribute information related to satisfaction of the criteria for volume caching to perform a volume caching operation corresponding to the criteria for volume caching comprises instructions executable by the processor to cause the apparatus to request a node to generate a cached volume at the node in accordance with a pre-defined configuration from the policy information.

20. The apparatus of claim 16, wherein the computer readable medium further has instructions executable by the processor to cause the apparatus to:

determine that attribute information for a node of the nodes has changed;

determine whether the changed attribute information satisfies the criteria for volume caching; and request that the node with the changed attribute information perform a volume caching operation corresponding to the criteria for volume caching satisfied by the changed attribute information in response to a determination that the changed attribute information satisfies the criteria for volume caching.

21. The apparatus of claim 16, wherein the computer readable medium further has instructions to periodically request the nodes of the storage system cluster for attribute information updates.

* * * * *